United States Patent [19]

Forester et al.

[11] Patent Number: 4,543,113
[45] Date of Patent: Sep. 24, 1985

[54] UNIFORM MINIMUM-PERMEABILITY WOVEN FABRIC, FILTER, AND PROCESS THEREFOR

[75] Inventors: Roger J. Forester; Lloyd R. White, both of St. Paul, Minn.

[73] Assignee: Minnesota Mining and Manufacturing Company, St. Paul, Minn.

[21] Appl. No.: 640,154

[22] Filed: Aug. 10, 1984

[51] Int. Cl.⁴ .............................................. B01D 46/00
[52] U.S. Cl. ...................................... 55/378; 55/523; 55/527; 428/225; 501/95
[58] Field of Search ............. 55/378, 523, 527, 341 R; 210/484, 497.1; 501/95; 139/420 R, 420 C; 428/225, 32

[56] References Cited

U.S. PATENT DOCUMENTS

| | | | |
|---|---|---|---|
| 3,808,015 | 4/1974 | Seufort | 561/95 |
| 3,843,561 | 10/1974 | Sobel | 55/527 X |
| 3,884,659 | 5/1975 | Ray | 55/379 |
| 3,953,561 | 4/1976 | Shin | 501/95 X |
| 4,047,965 | 9/1977 | Karst et al. | 501/95 |
| 4,149,863 | 4/1979 | Ballard | 55/379 |
| 4,240,833 | 12/1980 | Myles | 501/95 X |
| 4,259,095 | 3/1981 | Johnson | 55/302 |
| 4,320,074 | 3/1982 | Birchall et al. | 501/95 X |
| 4,398,931 | 8/1983 | Shevlin | 55/341 |
| 4,412,854 | 11/1983 | Layden | 501/95 X |

*Primary Examiner*—Charles Hart
*Attorney, Agent, or Firm*—James A. Smith; Donald M. Sell; Lorraine R. Sherman

[57] ABSTRACT

A high temperature stable woven fiber fabric has uniform minimum gas permeability of less than 2.0 L/M/cm² and is capable of withstanding at least 10,000 cycles in a Bally TM Flexometer test without failure. An untreated fabric is subjectd to a sequential process which provides uniform permeability and greater flexiblity and acid resistance to the treated fabric. The treated fabric is particularly useful in high temperature applications such as filter elements and furnace curtains.

24 Claims, 8 Drawing Figures

UNIFORM MINIMUM-PERMEABILITY WOVEN FABRIC, FILTER, AND PROCESS THEREFOR

TECHNICAL FIELD

This invention relates to a high temperature stable fiber fabric having uniform permeability. In another aspect it relates to a filter assembly containing a high temperature stable filter comprising a ceramic fabric filter element and a support therefor.

BACKGROUND ART

In recent decades non-vitreous inorganic or metal oxide fibers have become known in the art. Although such fibers have desirable physical properties, such as high temperature stability, their utility is inherently limited by their inability to withstand mechanical and chemical stresses accompanying certain applications. One such application is high temperature filtration.

A filtering apparatus having a multiplicity of tubular filter bags mounted in a filter housing is known in the art and commonly called a "baghouse". Each filter bag, generally made of gas permeable, woven inorganic or organic materials, has a tubular supporting frame or cage therein which holds the filter bag in an open tubular configuration. A gas stream laden with particulate matter flows into the bag and the particulate matter gradually becomes trapped or deposited on the exterior surface of the filter bag, due to the flow of gas from the outside to the inside of the filter bag. The particulate is not so trapped initially since the pores in the woven material are usually many times the size of the particulate separated. When the particulate laden gases first pass through the woven material or fabric, the efficiency of separation is low until enough particulate has been trapped to form a "precoat" on the fabric. With particulates frequently encountered in industrial processes, the precoat layer will normally form in a matter of seconds. Once the precoat layer is formed, the efficiency of separation of the particulate from the gas stream will usually be better than 99 percent, i.e., about 99 percent of the particulate is removed from the gas stream. With the passage of time, as a result of particulate accumulating in the fabric of the filter bag, the residual pressure drop across the filter bag gradually increases and the bags must be replaced, either due to excessive pressure drop or because of bag failure.

Efficiently operating woven fabric baghouse filters generally have a gas flow pressure drop of 2 to 6 inches (5 to 15 cm) of water and are rated at 1 to 8 cubic feet per minute per square foot (3.2 to 25.6 liters per minute per $dm^2$) of fabric area. As the particulate layer builds up on the filter fabric, the pressure drop across the filter increases and it becomes necessary to clean the filter bag to dislodge the accumulated particulate therefrom. A manometer connected across the filter bag is used to determine when the filter should be cleaned. The cleaning can be automatically performed, either by mechanical shaking or reverse jet flow. The interval between cleanings can be from a few minutes to hours depending upon the rate of collection of particulate on the filter fabric. In a baghouse cleaning operation, where a section of filters can be removed from operation by means of automatic dampers, the cleaning operation can be performed in a matter of seconds, e.g., 2 to 10 seconds.

The presence of particulate within the filter bag fabric causes abrasive wear of the filter bags during cleaning and results in a shortened useful life. Any movement of the filter bag material, particularly adjacent to the stiffer sewn seams, and especially when loaded with an abrasive particulate, can increase the rate of the abrasive action, particularly on high modulus inorganic fibers which are inherently highly susceptible to abrasive wear. A support cage for the filter bag which has excessively large openings will permit undue flexing of the fibers in the filter fabric during cleaning. Thus, the basic form and structure of the filter bag and filter bag cage are critical factors in extending filter service life, especially when used for the removal of highly abrasive particulate in a corrosive gas, under which conditions a filter bag may wear out in a matter of weeks and need replacement.

The prior art has recognized the problem of cleaning bag filters and the problem of filter fabric wear by abrasion. U.S. Pat. No. 4,259,095 discloses support-diffuser tubes for improved support and particulate cleaning of filter bags which are subjected to cleaning by a pulse of reverse purge air. U.S. Pat. No. 4,149,863 discloses a fiberglass cloth bag filter over a wire mesh cage, the bag being cleaned by reverse blasts of air. Glass fiber and the mesh support are alleged to overcome problems of the art relating to synthetic fiber type bag filters failing at elevated temperatures in corrosive environments. U.S. Pat. No. 3,884,659 discloses a flexible, conventional, porous filter bag in slack position over a cylindrical wire cage, the bag being cleaned by a reverse jet air blast which causes the bag to inflate and snap away from the cage so as to dislodge accumulated solids from the filter media. U.S. Pat. No. 4,398,931 teaches a ceramic fabric tape tightly spiral-wound over a rigid frame to form a high temperature stable filter. The preparation of such a filter is labor-intensive, and the over-lap configuration results in the filter having areas of varying gas permeability.

Synthetic organic and glass fiber fabric bag filters have been used in the art in baghouse applications. It is known that many synthetic organic fabrics deteriorate at temperatures above 300° C. and glass fiber deteriorates above 450° C.

The present society's need for energy conservation has made it desirable to reclaim waste heat from power plants using fossil fuels. It is necessary to remove particulate matter from gas streams exiting from these plants, where the gases often are at a temperature in the range of 700° to 1000° C., before sending the hot, often corrosive, gas through an expansion or combustion turbine which is used for producing electrical energy. Fabrics used in prior art filters, such as glass fiber materials, cannot withstand these high temperatures in combination with corrosive sulfur combustion products of fossil fuels. Further, fabrics which can withstand the higher temperatures deteriorate due to the abrasive character of some particulate matter and the flexing of the fibers during filtration and cleaning of the filter by reverse air jet blasts.

DISCLOSURE OF THE INVENTION

Briefly, the present invention in one aspect provides woven fiber fabric, preferably ceramic, having uniform minimum fluid permeability of less than 2.0 $L/M/cm^2$ and being capable of withstanding at least 10,000 cycles in a Bally TM Flexometer test (described below) without failure. The fabric of the invention can be a high temperature stable, woven ceramic fiber fabric having low fluid permeability, greater flexibility (i.e., is more resistant to fracturing under low load flexing) and acid resistance compared to conventional ceramic fiber fabrics.

It has been found that permeability can be controlled to a uniform minimum value for any type of fabric weave by a unique process which includes gentle manipulation or flexing of a heat cleaned fabric. The fabric manipulation can comprise tumbling which results in "relaxation" or realignment or consolidation of the fibers so that the individual fibers assume a closely packed position. Spaces or openings or channels which were present in the untreated fabric become closed. This results in uniform permeability throughout the filter cloth. For efficient filtration, resistance to fluid flow through a fabric must be uniform, because fluid will pass through the path of least resistance. Channels are such a path and result in inefficient filtration until equilization by particulate build-up takes place.

The unique process of the invention includes a final heat treatment step. It is noted that the heat treatment sets the fiber alignment in the cloth and it substantially increases the flexibility as shown by a Bally TM Flexometer evaluation. Additionally, resistance to acid attack is greatly increased.

In another aspect, the present invention provides a filter assembly for removing particulate matter from high temperature gas streams and is suitable for cleaning by a periodic reverse purge of air, the filter assembly comprising:

a tubular frame or cage (preferably rigid) made of high temperature stable material, having at least one open end, and adapted to be connected to a gas compartment at its at least one open end, said cage having openings to provide at least 20 percent open area on its lateral surface, with each opening having an area of less than 125 square millimeters, a tubular filter element surrounding and contiguous with the lateral surface of said cage and comprising a substantially conformable tube, which preferably is seamless, of woven ceramic fiber fabric having uniform minimum gas permeability of less than 2.0 L/M/cm$^2$(65 CFM/ft$^2$), preferably 0.15 to 2.0 L/M/cm$^2$(5 to 65 CFM/ft$^2$), more preferably 0.30 to 1.5 L/M/cm$^2$(10 to 50 CFM/ft$^2$), and most preferably less than 0.8 L/M/cm$^2$ (25 CFM/ft$^2$), for efficient removal of smaller particulate, and being capable of withstanding a Bally TM Flexometer test of at least 10,000 cycles and having at least one open end, and a means for securing said filter element to said cage, said means optionally forming an end cap for an open end of the filter.

Both ends of the filter can be open but one end may be closed, either by means of a sheet-like piece of fabric of woven ceramic fibers (as where the cage has a perforated base on its lower end, not a preferred embodiment) or by a solid (unperforated) cap of high temperature stable material.

As used in this application:
"fiber" means a filament structure having a length of at least 100 times its diameter;
"continuous fiber" (or "filament") means a fiber which has infinite length compared to its diameter, as described in U.S. Pat. No. 4,047,965;
"harness" means a mechanical framework through which warp threads are drawn on a loom;
"pick count" means the number of threads per 2.54 cm in either the warp or filling direction of a fabric;
"denier" means the weight in grams of 9000 meters of a yarn;
"roving" means an assembly of one or more strands of ceramic fibers without twist;
"strand" or "yarn" means a plurality of fibers;
"basis weight" means the weight of fabric per unit area (i.e., grams per square meter);
"filter fabric" is a high temperature stable woven fabric, which may have any desired weave, such as plain, twill, drill, satin, etc.;
"substantially conformable" means surrounding the cage of a filter in contiguous fashion so as to correspond in general shape to the cage, the resulting structure having a cage, which preferably is rigid, with the filter element capable of flexing upon pulse cleaning;
"flexible" means the ability to withstand repeated bending without failure, e.g., 10,000 cycles on a Bally TM Flexometer;
"spaces" or "channels" mean openings between the yarns of a fabric;
"cage" is a supportive framework of any desired configuration having open work on its sides such as a skeletal frame or perforated sleeve;
"filter" means a filter element in the form of a woven fabric tube which may have a seam but preferably is seamless and the cage on which it is supported, the cage being open on at least one end;
"filter element" means a woven filter fabric having a tubular shape and which is supported by a cage, or a flat sheet which can be supported by a frame or clamps;
"filter assembly" means, for example, a filter and assembly adapted to be placed in a gas separator plate of a filter housing or it can be a flat, sheet-like fabric on a support;
"low load flexing" means repeated bending of fabric under very low or no tensile stress;
"lateral surface" means the sides of a cage and does not include the top and bottom;
"tubular" means a shape that is cylindrical, conical, box-like, or any variation of these shapes;
"uniform minimum permeability" means essentially controlled and identical permeability values which are the minimum for that fabric which can be obtained throughout the structure;
"failure" in a Bally Flexometer test means the presence of at least one broken yarn and/or excessive fuzzing of the sample which is visible to the naked eye;
"non-vitreous" material is one that is not derived from a melt;
"heat set" means a high temperature treatment which relieves stresses in the yarns so that they are relaxed; and
"ceramic metal oxides" means metal oxides which can be fired into a rigid or self-supporting polycrystalline form and are stable in a normal air environment, e.g., 23° C. and 50 percent relative humidity.

The present invention provides low and uniform fluid (i.e., gas or liquid) permeable, acid resistant, woven fiber fabric and woven ceramic fiber fabric filters which are high temperature stable, i.e., they maintain their integrity for prolonged periods at temperatures up to at least 1150° C. and for at least short periods at temperatures up to at least 1400° C. The fabric filters are able to withstand reverse jet blast cleaning without visible damage, e.g., at least 50,000 cycles.

DETAILED DESCRIPTION

The present invention provides a low and uniform gas permeable fiber fabric, preferably ceramic, by means of a unique sequential treatment comprising:

(a) heat cleaning a woven fiber fabric at a temperature and for a time period sufficient to remove all undesired organic materials (e.g., sizing), preferably the temperature is in the range of 450° to 750° C., most preferably 650° C., preferably for a time in the range of 1.5 to 0.25 hours, most preferably about 30 minutes;

(b) gently mechanically flexing or manipulating the fabric at room temperature (for example, tumbling in an ordinary home laundry clothes dryer for 15 to 30 minutes, preferably about 15 minutes) which realigns or consolidates the fibers so as to fill in spaces or openings and reduce fabric permeability to fluids to a uniform minimum value; and (c) heat treating at a temperature and for a time period sufficient to heat set the fabric so as to maximize its flexibility and increase its resistance to acid attack, for example, at a temperature in the range of 800° to 1100° C. for 2 hours to 10 minutes, preferably 950°–1000° C. for 30 min., for continuous fiber fabric of alumina-boriasilica (Nextel 312 ™ ceramic fiber fabric, 3M). This procedure causes fibers to show increased flexibility and durability.

Permeability as referred to herein is measured by the procedure described in ASTM D-737-75 and is controlled normally by the type of weave used to make a cloth. However, with stiff ceramic fibers, a cloth cannot be woven tightly because the fiber breaks. This loose weave provides an "open" weave cloth and the permeability of the untreated fabric is quite variable because of the openings between fibers.

It has been found that measurements of permeability tend to vary widely unless the samples have been heat cleaned and then gently flexed. Heat cleaned samples of fabric which have not been flexed also display substantial variability in permeability. Gentle flexing of the cloth reduces its permeability to the minimum attainable for that particular fabric. The choice of yarn, weave pattern, and pick count can be varied to control the basic or minimum permeability for any particular woven fabric.

It has also been found that if a fabric is heat treated but not flexed beforehand, it is not possible to reduce its permeability to the minimum by flexing it. Hence, the sequence of applying the steps of heat cleaning, flexing, and heat treatment is critical. If heat treating is done before flexing, permeability is set at a value substantially greater than the minimum. Example 4 below illustrates this.

The filter of the present invention is useful in removing particulate matter from hot gas streams, particularly in a "baghouse" assembly and in chemical process streams, and has the following characteristics:

(1) the filter material is stable at high temperatures, i.e., 700° to 1400° C. as noted above;

(2) the filter fabric can be formed into a filter media having uniform minimum gas permeability of less than 2.0 L/M/cm$^2$, preferably in the range of 0.15 to 2.0, more preferably in the range of 0.30 to 1.5 L/M/cm$^2$, and most preferably less than 0.8 L/M/cm$^2$;

(3) the filter fabric is capable of withstanding a Bally ™ Flexometer test of at least 10,000 cycles without failure;

(4) the filter element resists disintegration from mechanical and chemical forces when in use; and (5) the filter fabric has a long life.

In one embodiment, the filter assembly of the present invention comprises a woven, ceramic fiber fabric, preferably seamless, tubular filter for filtering particulate material which is entrained in a hot gas stream, e.g., in a flue gas baghouse compartment. Particulate laden gas can be directed into a filter housing and flows through gas permeable filter elements while the particulate material is filtered and retained on the exterior surface of the filter elements. Periodically, a reverse purge of air can be directed into the upper end of the tubular filters causing the filter element to flex so as to dislodge the trapped particulate material from the outer surface of the filter elements, thus cleaning the filters. Although a seamed tubular filter has a shorter life due to increased abrasion upon flexing, damage from sewing, sewing thread failure, etc. than a seamless filter, a seamed tubular filter is also envisioned within the present invention.

The filter of the present invention, which in one embodiment is a woven, tubular, seamless, ceramic fiber fabric filter element is unique in the art. Heretofore, it has been unknown to provide seamless tubular filter elements of woven ceramic fiber. It is advantageous to have a seamless filter element because, as described above, seams contribute to filter element failure and short life.

The present invention provides an improvement over prior art filter elements which need frequent replacement and which cannot be used at high temperatures or which have areas of varying permeability. Because the cermic fiber filter element is mechanically and heat treated in a prescribed sequence the fabric provides uniform minimum fluid-permeability, enhanced resistance to acid and abrasive attack, and has a long useful life.

In a preferred embodiment, a filter element suitable for high temperature service can be prepared from seamless tubing woven from Nextel ceramic fiber yarn by subjecting that tubing to the above-described sequence of mechanical and heat treating procedures.

Seamless tubing useful as a filter element of the present invention can vary as to the type of weave, yarn, and pick count. Tubing can be woven as a double layer of fabric which when opened provides a tubular structure (see FIG. 8 below). In the weaving process the weave simply continues from the top layer to the bottom and so on. The resulting tubing emerges from the loom as a flat, double layer of fabric whose edges can be called "turnarounds". The fill yarns must make 180° turns at the turnarounds which can result in some breakage of individual filaments. The tensile strength of the fabric at the turnarounds is about 20 percent less than the strength of the flat parts of the tubing. Nevertheless, the fabric at the turnarounds is at least twice as strong as any seam sewn onto flat goods to form the material into a tube, such seams being potential weak spots when the tube is subjected to high temperatures and mechanical and chemical stresses. This difference was demonstrated in a field test of six bags using flue gas from an in-house industrial incinerator. Three seamless bags were tested along with three which had seams. All six were mounted in a small baghouse which was attached to a slip-stream taken out of the incinerator. Bags were cleaned by pulses of air at 5.6 kg/cm$^2$ (80 psig) pressure. After approximately 20,000 pulses, the bags with seams failed, with the seams torn from end to end in all three bags. Seamless bags withstood 50,000 pulses without damage and were in good condition when the test was terminated. Other methods of weaving tubular ceramic fiber fabric (e.g., on a circular loom) are envisioned within the present invention.

In another embodiment, the filter assembly of the present invention comprises a flat, woven ceramic fiber fabric sheet supported in a frame structure which, for example, can be used as a furnace filter.

Figure 2:
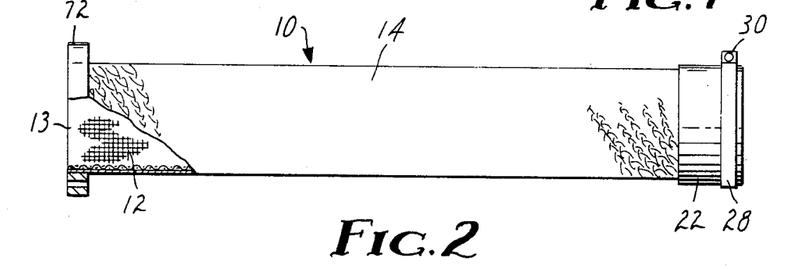
FIG. 2 is an elevational view of one filter of FIG. 1, parts thereof broken away and shown in section.

Referring to FIG. 2 of the drawing, one embodiment 10 of the filter of the present invention is shown. Tubular cage 12 is made of wire screen and has an open upper end 13. Tubular shaped ceramic fiber fabric 14 covers the lateral surface of cage 12 so as to provide a tubular, gas permeable, substantially conformed, rigid filter 10. Woven ceramic fabric 14 would normally cover the entire lateral surface of cage 12, but in FIG. 2 it is shown only partially covering the cage so as to show the nature of the cage's lateral surface. Woven ceramic fabric 14 has a tubular shape and is seamless, but in a less preferred embodiment it can have a seam along the length of the tube.

Figures 1, 7:
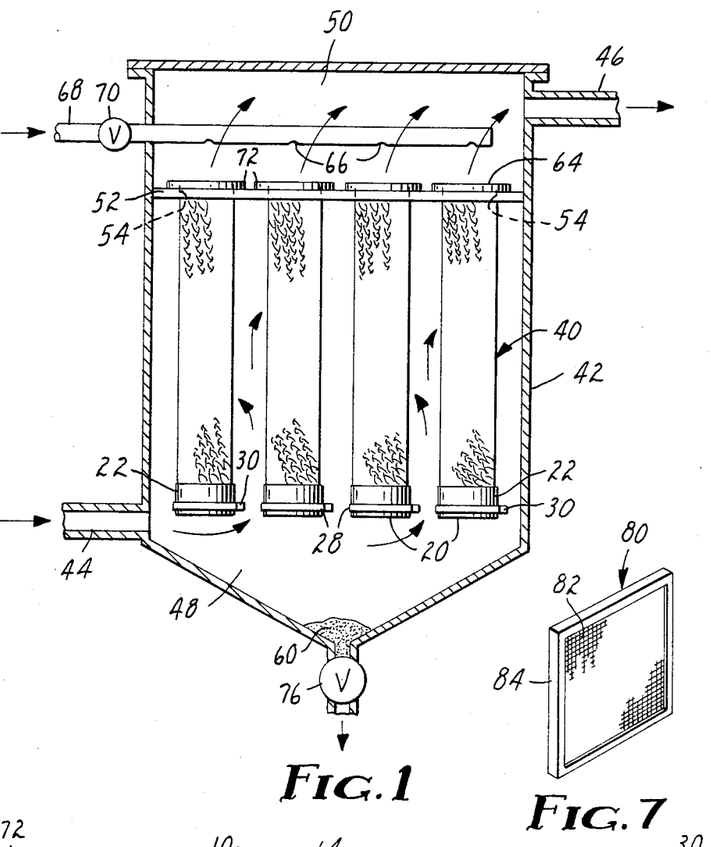
FIG. 1 is a cross-sectional view of a housing containing a plurality of filter assemblies.
FIG. 7 is a perspective view of a flat filter having a flat piece of fabric of the invention supported in a frame.

FIG. 1 shows housing 42 for a plurality of filter assemblies 40 having inlet 44 for particulate bearing gas and outlet 46 for clean gas therefrom. Housing 42 is divided into inlet and outlet compartments 48 and 50 by gas separator plate or tube sheet 52 which has a series of apertures 54 therein. Arrows inside housing 42 show the direction of gas flow during the operating cycle. Into each aperture 54 of gas tube sheet 52 is fitted filter assembly 40 having lower end 20 closed by end cap 22 and upper open end 64. End cap 22 is firmly anchored in place by clamping band 28 which is tightly secured thereto by tightening bolt 30, these parts also being shown in FIG. 2. Upper open ends 64 are below openings 66 of compressed air line 68 so as to receive, during a cleaning cycle, a blast of compressed air, controlled by valve 70, therefrom. During the cleaning cycle, particulate matter is dislodged from the exterior surface of filter assemblies 40 and falls to the bottom of housing 42 from where it accumulates as pile 60 which can be removed periodically through valve 76. Filter assembly 40 has collar 72 fastened thereto by any convenient means, such as clamping. Collar 72 has holes (not shown) radially disposed therein for insertion of fastening means, such as bolts, to affix collar 72 to gas tube sheet 52.

Figure 3:
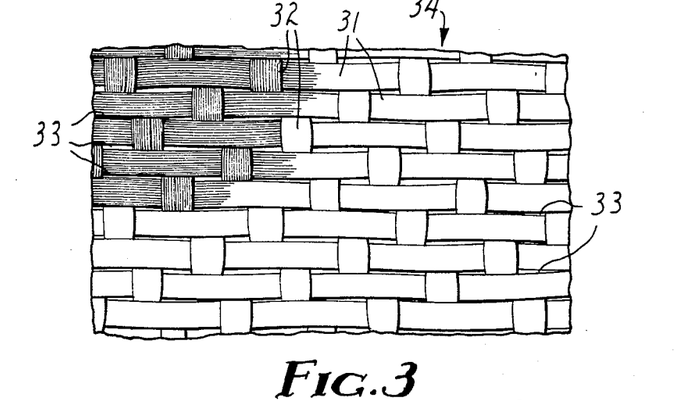
FIG. 3 is an enlarged elevation of a portion of a Harness weave fabric in the untreated state.
Figure 4:
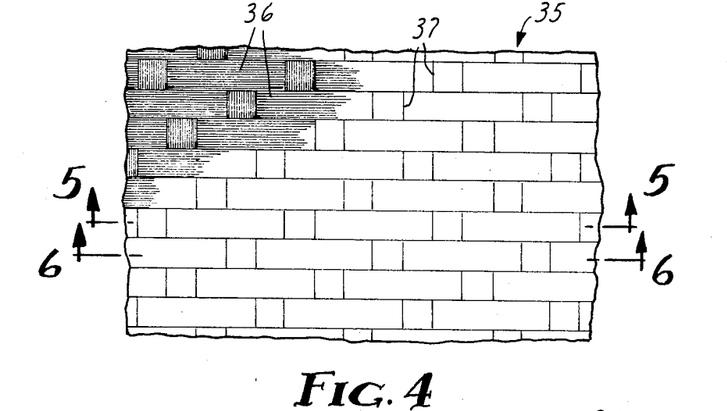
FIG. 4 is an enlarged elevation of a portion of the fabric of FIG. 3 after treatment according to the present invention.
Figure 5:
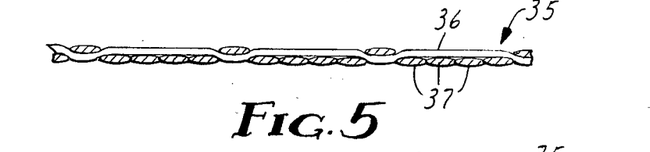
FIG. 5 is a sectional view of the fabric taken alone line 5—5 of FIG. 4.
Figure 6:
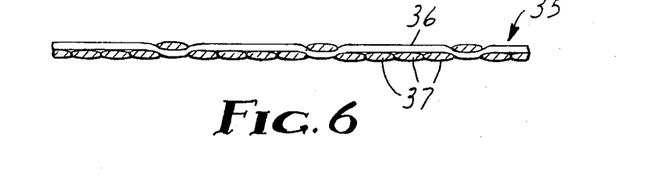
FIG. 6 is a sectional view of the fabric taken along line 6—6 of FIG. 4.

FIGS. 3 and 4 show a flat piece of woven ceramic fiber fabric, untreated 34 and treated 35, respectively, according to the process of the present invention. In FIG. 3 horizontal strands 31 and vertical strands 32 are aligned so that numerous spaces or openings 33 are present in the fabric. Such a fabric sheet 34 is not at its minimum permeability. FIG. 4 shows a treated sheet of fabric 35 in which horizontal strands 36 and vertical strands 37 have been "relaxed" and no openings are visible, even at a magnification of 7.5 times. FIGS. 5 and 6 show a sectional view of the treated fabric 35 of FIG. 4. Horizontal strand 36 and vertical strands 37 are shown. There are no visible openings in the weave.

FIG. 7 shows flat filter 80 having a sheet of treated ceramic fiber fabric 82 supported by frame 84 which can be made of any high temperature stable material such as Inconel ™ (International Nickel Co.)

Figure 8:
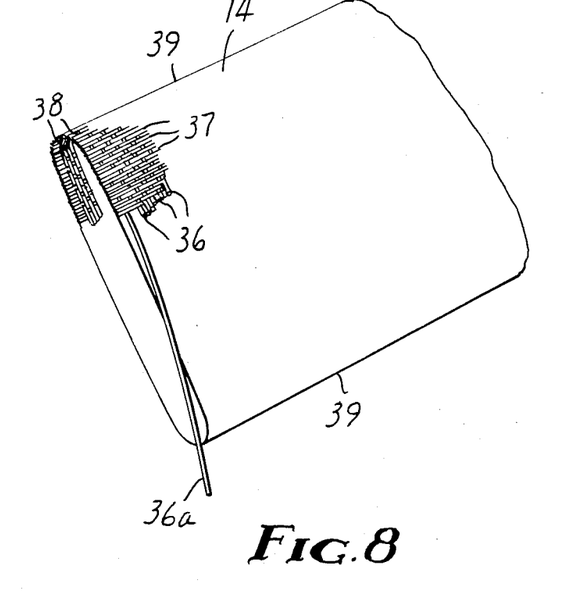
FIG. 8 is a perspective view of the tubular filter element of FIG. 2 showing the weave.

FIG. 8 shows woven seamless tubular ceramic fiber fabric 14. Vertical strands 37 and horizontal strands 36 are shown. End strand 36a is shown being unravelled from ceramic fiber fabric 14 indicating that horizontal strand 36 is continuous throughout the length of tubular fabric 14. End strand 36a is shown at turnarounds 38 which create bulges 39, along the length of tubular fabric 14 when it is in an open position and applied to a cage.

The fabric treating process of the present invention can be applied to any weave, pick count, yarn, or basis weight of fiber fabric, but is particularly useful for loosely woven fabrics such as ceramic or fiberglass fiber fabrics. The benefits achieved (decrease in permeability, increase in flexibility, increase in acid resistance) are greater for looser weaves.

The woven ceramic fiber fabric which can make up the filter element of the present invention comprises woven strands of ceramic fibers, each of which may be made of the same or different continuous ceramic fiber or a blend of two or more kinds of continuous ceramic fibers. Strands of ceramic fiber are made into a pliable fabric which is then subjected to the above-described heat and mechanical treatment and may contain one or more of the above-mentioned fibers; the fibers may be twisted, twistless, false-twisted, tangled, or spun staple fibers. The ceramic fiber strands comprise inorganic fibers such as continuous fused silica fibers (Astroquartz ™, J. P. Stevens, Co., NY) and leached fiberglass such as Refrasil ™ (99% silica, HITCO, Los Angeles, CA), and particularly useful are non-vitreous ceramic fibers such as Nicalon ™ silicon carbide fiber (Nippon Carbon, Ltd., Japan), or fibers of ceramic metal oxide(s) (which can be combined with non-metal oxides, e.g., $SiO_2$) such as zirconia-silica fibers (see U.S. Pat. Nos. 3,793,041 and 3,709,706), alumina-silica fiber (see U.S. Pat. No. 4,047,965), graphite fiber (Union Carbide), alumina-chromia-metal (IV) oxide fiber (see U.S. Pat. No. 4,125,406), titania fibers (see U.S. Pat. No. 4,166,147). Preferably, the ceramic fiber fabric comprises continuous alumina-boria-silica ceramic fibers (such as those sold under the trademark Nextel 312 ceramic fiber), having an alumina:boria mol ratio of 9:2 to 3:1.5, and containing up to 65 weight percent silica, preferably 20 to 50 weight percent silica, as described in U.S. Pat. No. 3,795,524. Nextel 312 ceramic fiber is a roving of a commercially available fiber described in 3M Bulletins, e.g., N-MHFOL(79.5)MP, N-MPBFC-2(109.5)11, N-MPBVF-1 (89.5) 11, N-MTDS(79.5)MP, N-MPBBS-(89.5)11, and N-MOUT (89.4)MP.

The ceramic fiber fabric may be of any preselected thickness. Preferably, the fabric has a thickness in the range of 0.5 to 1.0 mm so as to provide a pressure drop across the filter fabric of about 0.1 inch (0.25 cm) of water, which does not interfere with filter performance.

The ceramic fiber fabric after being heat and mechanically treated as described above has surprising and unusual permeability characterics, i.e., a uniform minimum permeability of up to 2.0 L/M/cm$^2$, preferably in the range of 0.15 to 2.0, and is capable of withstanding at least 10,000 cycles in a Bally Flexometer test without failure.

Preferably the filter element is of woven seamless tubing. Any weave, thickness, etc. of ceramic fiber fabric is envisioned within the present invention.

The filter of the present invention is formed by sliding the treated low permeability ceramic fiber fabric of the invention onto a cage. The tightness of the tube on the cage is sufficient so that the lateral movement of the filter element during the filtering or cleaning cycle at any point is less than 3 mm and preferably less than 2 mm, from the surface of the cage. Preferably, the cage is of elongated, generally elliptical or cylindrical shape, but any desired shape is envisioned within the scope of the present invention, open on at least one end and capable of being connected to a gas separator plate by suitable collar or clamping means, for example, a compression ring clamp such as an airplane clamp. The cage has at least one (first) open end. It can have one closed (second) end, this second end optionally having perforations or open areas therein, or it can be open at its second end and closed by means of an end cap, or it can be connected to a gas separator plate similar to the first end. The filter element is a gas-permeable, flexible, substantially conformed structure preferably in a rigid configuration.

The cage has open work formed by cribriform or is in the form of a screen and comprises 20 to 90 percent, and preferably 30 to 70 percent or more, open areas or perforations, with any single perforation having an area of less than 125 square millimeters. High open area cages typically are screens (65–90 percent open areas), and for example, a screen with 8 mm openings (maximum distance across opening) using 1.85 mm diameter wire has about 81 percent open area. The screen structure is useful because of the uniformity of support it provides to the fabric of the filter element, having no large areas which would be more susceptible to excessive flexing. It is preferred that the maximum distance across cage open areas should be less than about 12 mm and preferably in the range of 4 to 8 mm. Openings with maximum distance across of less than 1 mm are generally not efficient. The cage may be constructed of any high temperature stable material such as metals or ceramics capable of withstanding temperatures up to 1400° C. or more. It is also possible to substitute horizontally disposed rings of high temperature stable material attached to the filter element instead of a cage. Particularly useful materials are super alloy metals such as stainless steel, Stellite TM (Cabot Corp., Indianapolis, IN), Inconel TM (International Nickel Co., Inc., New York, NY), or ceramics such as alumina, mullite, stabilized zirconia, silicon carbide, steatite, or spinel.

The filter of the present invention is useful in any application requiring filtration of suspended or dispersed particulate matter from a high temperature gas stream, e.g., refinery process gas streams or combustion gases, where long term temperatures up to at least 1150° C. and short term temperatures up to at least 1400° C. or more are encountered. Such filters are useful, for example, in baghouse assemblies of power plants that burn fossil fuels, industrial incinerators, smelters, and other high temperature fluid stream processes. The filter element as described above comprising a flexible ceramic fiber fabric supported in a rigid manner by the cage, resists mechanical abrasion during cleaning, shows increased resistance to acid attack, and does not require frequent replacement.

The ceramic fiber fabric of the present invention which is treated in accordance with the heat and mechanical process described above is also useful, for example, in a flat filter supported by a frame, and as a curtain for use in a furnace. It is also useful as a liner in the transportation of molten metals such as aluminum. The fabric in addition to being high temperature stable, has low gas and liquid permeability, is flexible, has resistance to acid attack, and is long lasting.

The process of the present invention is useful to decrease the permeability and increase the flexibility and resistance to acid attack of any fabric woven from a brittle yarn. This includes all high temperature stable ceramic yarns as well as fiberglass.

Objects and advantages of this invention are further illustrated by the following examples, but the particular materials and amounts thereof recited in these examples, as well as other conditions and details, should not be construed to unduly limit this invention. In the Examples below, fabric designated 5H, ½, 30×30 means 5 Harness weave, each yarn consisting of two twisted strands of roving, and 30 yarns per 2.54 cm in both the warp and filling directions of the weave. Permeability was determined by the procedure described in ASTM D-737-75.

Test procedures (in addition to ASTM D-735-75 Permeability Test) referred to herein are:

I. BALLY FLEXOMETER TEST

The test procedure that was followed in using the Bally Flexometer (Bally Co., Switzerland) is described below. Fabric samples were cut into rectangular shapes, 45 mm×73 mm (1⅜ inch by 2⅞ inch) in size. The ends of the sample were taped with masking tape to avoid crushing the fibers when clamping them in the test device. The tape should be extended not more than 6 mm (0.25 inch) down the length of the sample. The samples were mounted in two clamps, one stationary, the other movable. The stationary clamp was fixed to the base of the Bally tester while its mating clamp was situated directly above it. The movable clamp oscillated through an angle of about 20 degrees during testing and the central portion of the sample was flexed due to this motion. In mounting samples, it was necessary to adjust the position of the oscillating clamp so that it was at the upper limit of its travel. When the sample was mounted and tightly positioned into place, the sample was not torn or unduly stressed by the motion of the machine. If this precaution were not taken, erratic results would be obtained. As many as twelve samples were tested simultaneously and after mounting, all samples were visually inspected to see that they were all mounted properly.

The test device was equipped with a cycle counter and automatic shut-off. That is, the number of cycles could be pre-set. What was typically done was to set the machine at 1000, start it, let it run until it stopped and then inspect the samples noting their appearance. The machine was then restarted and this step repeated for several 1000 cycle increments.

Not all fabrics responded in the same way when tested on the Bally Flexometer. For example, Nextel fabrics exhibited failure as follows:

There was an approximately circular region in the center of the sample where fuzz appeared due to breakage of individual filaments. Eventually, enough breakage occurred so that all or much of a single yarn broke and the broken ends protruded from the surface of the fabric. When this occurred the sample had failed and the number of cycles (to the nearest 1000) was noted. A complicating factor was ravelling of the samples. That is, sometimes the edge of the sample unravelled during testing. If this unravelling progressed into the central region of the sample, the test was not meaningful and was ignored. The tendency of samples to unravel could be reduced greatly by coating their edges with a rubber cement such as Sanford's Rubber Cement (Sanford, Bellwood, IL).

II. ACID RESISTANCE TEST

The following procedure involving exposing a fabric to acid and then heating it to 800° C. was used to evaluate the resistance of ceramic fiber fabric to acid attack. The exact steps were:
(1) preparing a solution of 10% by weight sulfuric acid by diluting concentrated sulfuric acid with water,
(2) dipping fabric samples in the 10% acid solution using a glass tray to contain the acid,
(3) removing the sample from the tray and blotting away excess acid using paper towels,
(4) placing fabric in an oven preheated to 800° C. for 30 minutes.

The test showed how fabrics responded to exposure to sulfuric acid followed by rapid heating to drive off the acid. It roughly simulated what happened when a filter element was cooled through the acid dewpoint and then reheated rapidly.

EXAMPLE 1

Three different 10.2 cm × 30.5 cm (4 in × 12 in) fabric examples (Nextel 312) were heat cleaned (650° C. 30 min), tumbled (25 cm diameter container, at 20 RPM for 12 hours), and heat treated (950° C., 30 min) in that order. Permeability was measured after each step; results are shown in TABLE I below.

TABLE I

Effects of Heat and Mechanical Treatments on Fluid Permeability of Nextel Fiber Fabric

| Sample (Basis wt. = 475 g/m$^2$ in all cases) | Permeability, L/M/cm$^2$ (CFM/ft$^2$) @ 127 mm H$_2$O ΔP | | |
|---|---|---|---|
| | After heat cleaning | After tumbling | After heat treatment |
| 1 5 Harness, 1/2 yarn, 30 × 30 pick count, (11 micrometer filament diam.) | 1.64 (50) | 0.82 (25) | 0.75 (23) |
| 2 5 Harness, 1/0 yarn 30 × 30 pick count (11 micrometer filament diam.) | 2.91 (89) | 0.95 (29) | 0.85 (26) |
| 3 5 Harness, 3/0 yarn 30 × 30 pick count (8 micrometer filament diameter) | 2.52 (77) | 0.46 (14) | 0.33 (10) |

The data of TABLE I show permeability was reduced to a minimum value for subjecting the samples to the 3-step sequential treatment of the invention.

EXAMPLE 2

Three different Nextel fabric samples were heat treated and then tumbled using the procedure and conditions as in Example 1. Permeability was measured after each step; results are shown in TABLE II below.

TABLE II

| Sample (basis wt. = 475 g/m$^2$ in all cases) | Permeability, L/M/cm$^2$ (CFM/ft$^2$) @ 127 mm H$_2$O ΔP | |
|---|---|---|
| | After heat treating | After tumbling |
| 4 5 Harness, ½ yarn 30 × 30 pick count, (11 micrometer filament diam.) | 1.64 (50) | 1.18 (36) |
| 5 5 Harness, 1/0 yarn 30 × 30 pick count, (11 micrometer filament diam.) | 4.69 (143) | 2.69 (82) |
| 6 5 Harness, 3/0 yarn 30 × 30 pick count (8 micrometer filament diameter) | 4.82 (147) | 2.13 (65) |

The data of TABLE II shows that fabrics which were heat treated before tumbling were heat set and did not pack well with tumbling, resulting in a higher permeability: compare TABLE I with TABLE II.

EXAMPLE 3

Nine different fiber fabric samples were evaluated for permeability in the untreated cloth state, after heat cleaning and after tumbling using the procedure and conditions of Example 1 except that samples 7 through 10 were heat cleaned at 650° C. and samples 11 through 15 were heat cleaned 426° C. The results are shown in TABLE III below.

TABLE III

Effects of Heat and Mechanical Treatments on Fluid Permeability in L/M/cm$^2$ (CFM/ft$^2$) at 127 mm H$_2$O ΔP

| Fabric type | Untreated material | After heat cleaning | After tumbling |
|---|---|---|---|
| 7 Nextel seamless tubing 5H 1/2 30 × 30 900 denier | 2.09 (43.7) | 1.64 (50) | 0.82 (25) |
| 8 Nextel flat-goods 5H 1/2 30 × 30 | 1.57 (48) | 1.25 (38.2) | 0.82 (25) |
| 9 Nextel flat-goods Plain weave, 1/0 20 × 16 | 4.76 (145.3) | 4.23 (129) | 2.18 (66.7) |
| 10 Nextel flat-goods ZS-11 8H 1/0 41 × 42 | 2.96 (90.3) | 2.56 (78) | 1.80 (55) |
| 11 Siltemp ™ (cloth)-silica fabric 5H 45 × 37 | 0.45 (13.7) | 0.32 (9.9) | 0.30 (9.25) |
| 12 Refrasil ™ Irish cloth- | 0.25 | 0.28 | 0.25 |

TABLE III-continued

Effects of Heat and Mechanical Treatments
on Fluid Permeability in L/M/cm$^2$
(CFM/ft$^2$) at 127 mm H$_2$O ΔP

| Fabric type | Untreated material | After heat cleaning | After tumbling |
| --- | --- | --- | --- |
| silica fabric 5H 71 × 63 | (7.8) | (8.4) | (7.5) |
| 13 fiberglass cloth | 2.01 | 2.12 | 1.56 |
| 8H 52 × 58 | (61.3) | (64.7) | (47.7) |
| 14 graphite cloth | 2.65 | 1.57 | 1.14 |
| 8H 25 × 23 | (81) | (48) | (34.7) |
| 15 silicon carbide cloth | 2.0 | 2.0 | 1.62 |
| 8H 22 × 21 | (62) | (61) | (49.3) |

The data of TABLE III show that heat cleaning alone had varying effects upon the permeability of the samples compared to the untreated cloth. In all cases, however, tumbling generally significantly relaxed the cloth and decreased the fluid permeability of the cloth to a uniform minimum value.

EXAMPLE 4

Samples of Nextel fiber fabric (5H 1/0 30×30 1800 denier) were subjected to various combinations and sequences of heat cleaning (650° C., 30 min), heat treating (950° C., 30 min.), and tumbling (12 hours, room temperature 20 RPM in a 15 cm diameter drum). Three runs (*indicates the average permeability values of two samples) were made for each category evaluated. For filtering applications it is most desirable to have permeability values that are uniform over the entire surface of the fabric. Permeability data are shown in TABLE IV below:

TABLE IV

| | Permeability L/M/cm$^2$ (CFM/ft$^2$) @ 127 mm H$_2$O ΔP Run | | |
| --- | --- | --- | --- |
| Sample | 1 | 2 | 3 |
| 16 heat cleaned (650° C., 30 min.) | 3.18 (97)* | 3.71 (113)* | 3.48 (106)* |
| 17 heat treated (950° C., 30 min.) | 4.43 (135)* | 4.79 (146)* | 4.53 (138)* |
| 18 heat cleaned & then heat treated | 2.30 (70) | 2.40 (73) | 2.20 (67) |
| 19 heat cleaned & then tumbled | 0.98 (30) | 0.72 (22) | 0.92 (28) |
| 20 heat treated & then tumbled | 3.84 (117) | 3.48 (106) | 3.51 (107) |
| 21 heat cleaned, heat treated & tumbled in that order | 2.07 (63) | 2.07 (63) | 2.10 (64) |
| 22 Heat cleaned, tumbled & heat treated in that order | 0.98 (30) | 0.92 (28) | 0.89 (27) |
| 23 untreated cloth, i.e. sized | 5.91 (180) | 7.87 (240) | 6.82 (208) |

The data of TABLE IV show that uniform minimum permeability values were achieved when fabric samples were sequentially heat cleaned, tumbled, and then heat treated.

EXAMPLE 5

Two samples of Nextel fabric 5H ½ 30×30 were treated as follows: One was heat cleaned (650° C. for 30 minutes) and tumbled in a clothes dryer (room temperature for 15 minutes) the other was heat cleaned, tumbled, and then heat treated (950° C. for 30 minutes). Both were acid treated according to the procedure described above.

The sample which was heat treated was flexible and had a glossy sheen after acid treating. The sample which had not been heat treated was dull in appearance, i.e. not glossy, and stiff so that bending resulted in breaking yarns in the fabric. The Nextel sample which had been heat treated showed greater resistance to acid attack than did samples which had not been heat treated.

Various modifications and alterations of this invention will become apparent to those skilled in the art without departing from the scope and spirit of this invention, and it should be understood that this invention is not to be unduly limited to the illustrative embodiments set forth herein.

We claim:

1. Woven ceramic fiber fabric having uniform gas permeability of less than 1.5 L/M/cm$^2$ and being capable of withstanding at least 10,000 cycles in a Bally TM Flexometer test without failure, said fabric being capable of maintaining its integrity for prolonged periods at temperatures of about 1150° C., and said fabric having essentially no visible spaces or openings present between the yarns at magnification of 7.5 times.

2. The fabric according to claim 1 wherein the integrity of said fiber is maintained up to at least 1150° C.

3. The fabric according to claim 1 wherein said ceramic fibers are selected from the group consisting of continuous fused silica, alumina-silica, zirconia-silica, alumina-chromia-metal (IV) oxide, titania, graphite, silicon carbide, and alumina-boria-silica fibers.

4. The fabric according to claim 3 wherein said ceramic fibers are alumina-boria-silica ceramic fibers.

5. The fabric according to claim 3 wherein said ceramic fibers are alumina-silica.

6. A filter comprising a filter element having fabric according to claim 1 supported on a frame, said filter being suitable for high temperature filtering applications.

7. The filter according to claim 6 wherein said filter element has a flat, sheet-like shape.

8. A filter element comprising woven ceramic fiber or fiberglass fabric having uniform gas permeability of less than 1.5 L/M/cm$^2$ and being capable of withstanding at least 10,000 cycles in a Bally TM Flexometer test without failure, said fabric being capable of maintaining its integrity for prolonged perids at temperatures of about 1150° C., and said fabric having essentially no visible spaces or openigns present between the yarns at magnification of 7.5 times, and said filter element having a tubular shape and having at least one open end.

9. The filter element according to claim 8 wherein said ceramic fibers are selected from the group consisting of continuous fused silica alumina-silica, zirconia-silica, alumina-chromia-metal (IV) oxide, titania, graphite, silicon carbide, and alumina-boria-silica fibers.

10. The filter element according to claim 9, wherein said ceramic fibers are alumina-boria-silica ceramic fibers.

11. The filter element according to claim 9, wherein said ceramic fibers are alumina-silica.

12. A filter comprising:
a tubular frame or cage made of high temperature stable material, having at least one open end, said cage having openings to provide at least 20 percent open area on its lateral surface, with each opening having an area of less than 125 square millimeters, and a tubular, filter element having at least one open end surrounding and contiguous with the lateral surface of said cage and comprising a substantially conformable, woven ceramic fiber fabric having uniform gas permeability of less than 1.5 L/M/cm$^2$, said fabric being capable of withstanding at least 10,000 cycles in a Bally ™ Flexometer test without failure, said fabric being capable of maintaining its integrity for prolonged periods at temperatures of about 1150° C., and said fabric having essentially no visible spaces or openings present between the yarns at magnification of 7.5 times, said filter being a gas permeable structure having at least one open end.

13. The filter according to claim 12 wherein said cage is made of metal screen.

14. The filter according to claim 12 wherein the integrity of said filter is maintained up to at least 1150° C.

15. The filter according to claim 12 wherein said ceramic fibers are selected from the group consisting of continuous fused silica, alumina-silica, zirconia-silica, alumina-chromia-metal (IV) oxide, titania, graphite, silicon carbide, and alumina-boria-silica fibers.

16. The filter according to claim 3 wherein said ceramic fibers are alumina-boria-silica ceramic fibers.

17. The filter according to claim 3 wherein said ceramic fibers are alumina-silica.

18. A filter assembly comprising:
a tubular frame or cage made of high temperature stable material, having at least one open end, and adapted to be connected to a baghouse gas compartment at its open end, said cage having openings to provide at least 20 percent open area on its lateral surface, with each opening having an area of less than 125 square millimeters,
a tubular, filter element surrounding and contiguous with the lateral surface of said cage and comprising a substantially conformable, woven ceramic fiber fabric having uniform gas permeability of less than 1.5 L/M/cm$^2$, said filter element being capable of withstanding at least 10,000 cycles in a Bally ™ Flexometer test without failure, said fabric being capable of maintaining its integrity for prolonged periods at temperatures of about 1150° C., and said fabric having essentially no visible spaces or openings present between the yarns at magnification of 7.5 times, and said filter element having at least one open end, and
a means for securing said filter element to said cage, said means optionally forming an end cap for the open end of the filter.

19. The filter assembly according to claim 18 wherein said ceramic fibers are selected from the group consisting of continuous fused silica alumina-silica, zirconia-silica, alumina-chromia-metal (IV) oxide, titania, graphite, silicon carbide, and alumina-boria-silica fibers.

20. The filter assembly according to claim 19, wherein said ceramic fibers are alumina-boria-silica ceramic fibers.

21. The filter assembly according to claim 19, wherein said ceramic fibers are alumina-silica.

22. The filter assembly according to claim 19, wherein said assembly is part of a baghouse filter assembly.

23. A filter assembly for cleaning by a periodic reverse purge of air, comprising:
an elongated, tubular metal cage having at least one open end, and connected to a gas compartment by fastening means at its open end, said cage having openings to provide at least 20 percent open area on its lateral surface, with each opening having an area of less than 125 square millimeters,
a seamless, tubular filter element surrounding and contiguous with the lateral surface of said cage comprising a substantially conformable, woven ceramic fabric of alumina-boria-silica fibers having a basis weight of 300 to 700 g/m$^2$, said filter element having a uniform gas permeability of less than 1.5 L/M/cm$^2$ and being capable of withstanding at least 10,000 cycles in a Bally ™ Flexometer test without failure, said fabric being capable of maintaining its integrity for prolonged periods at temperatures of about 1150° C., and said fabric having essentially no visible spaces or openings present between the yarns at magnification of 7.5 times, and the filter element being a gas permeable, tubular structure open at one end, said alumin-boria-silica fibers having an alumin:boria mol ratio of 9:2 to 3:1.5, and containing up to 65 weight percent of silca, and
a means for securing said filter element to said cage.

24. The filter assembly according to claim 18 wherein said closed end of said cage has openings therein and said means further secures a sheet-like piece of fabric of woven ceramic fiber over said open end of said cage.

* * * * *

UNITED STATES PATENT AND TRADEMARK OFFICE
CERTIFICATE OF CORRECTION

PATENT NO. : 4,543,113

DATED : September 24, 1985

INVENTOR(S) : Roger J. Forester and Lloyd R. White

It is certified that error appears in the above-identified patent and that said Letters Patent is hereby corrected as shown below:

Col. 3, line 18, "equilization" should read --equalization--

Col. 3, line 65, "$\bar{+}$ harness" should read --"harness"--

Col. 5, line 10, "a Harness" should read --a 5 Harness--

Col. 5, line 15, "alone" should read --along--

Col. 12, line 14, "for" should read --by--

Signed and Sealed this

Third Day of December 1985

[SEAL]

Attest:

DONALD J. QUIGG

Attesting Officer

Commissioner of Patents and Trademarks